United States Patent
Allaei

(12)
(10) Patent No.: US 6,424,887 B1
(45) Date of Patent: Jul. 23, 2002

(54) MOTOR NOISE SILENCER WITH VIBRATION-BASED COOLING SYSTEM

(75) Inventor: Daryoush Allaei, Minnetonka, MN (US)

(73) Assignee: Quality Research, Development & Consulting, Inc., Chaska, MN (US)

( * ) Notice: Subject to any disclaimer, the term of this patent is extended or adjusted under 35 U.S.C. 154(b) by 0 days.

(21) Appl. No.: 09/413,275

(22) Filed: Oct. 6, 1999

(51) Int. Cl.[7] .................................................. H02K 5/24
(52) U.S. Cl. ...................................... 700/280; 181/202
(58) Field of Search ........................ 700/280; 318/611, 318/558; 181/198, 200, 202

(56) References Cited

U.S. PATENT DOCUMENTS

| | | | | |
|---|---|---|---|---|
| 3,980,912 A | * | 9/1976 | Panza | 310/51 |
| 4,150,313 A | | 4/1979 | Panza | 310/51 |
| 5,049,770 A | * | 9/1991 | Gaeth et al. | 310/89 |
| 5,124,600 A | * | 6/1992 | Hedeen | 310/51 |
| 5,513,226 A | | 4/1996 | Zuroski | 381/71 |
| 5,647,314 A | | 7/1997 | Matsumura et al. | 123/184.57 |
| 5,894,629 A | * | 4/1999 | Kim | 15/326 |
| 5,919,030 A | | 7/1999 | Iwatake et al. | 415/119 |
| 5,977,666 A | * | 11/1999 | Horski et al. | 310/51 |

OTHER PUBLICATIONS

"Sorbothane Product Sheets", 7 pages, Date Unknown.

* cited by examiner

*Primary Examiner*—Paul P. Gordon
(74) *Attorney, Agent, or Firm*—Fogg, Slifer, Polglaze, Leffert & Jay, PA

(57) ABSTRACT

A motor noise silencer reduces noise at a source, such as an unbalanced electromechanical motor. The silencer, in one embodiment, comprises a multi-layer shell and an integrated vibration-based cooling system. The shell has an inner layer, a middle sound and vibration absorbing layer, and an external layer. The middle layer offers a soft coupling between the outer and inner layers. Heat trapped within the silencer is channeled out by utilizing a vibratory motion of a source (i.e., motor) and motor support system. The silencer provides noise reduction while providing ventilation using vibration generated by the motor.

22 Claims, 4 Drawing Sheets

MOTOR NOISE SILENCER WITH VIBRATION-BASED COOLING SYSTEM

TECHNICAL FIELD OF THE INVENTION

This invention is related to noise, sound, acoustic, and vibration reduction systems and in particular it is related to noise reduction at a source.

BACKGROUND OF THE INVENTION

Electrical motors used in manufacturing, mining, food processing, and oil industries generally have a metal housing or frame that encloses all the internal motor components. Often, these motors have a fan cooling system or water cooling system to remove heat from the interior of a motor. They may also have greased bearings that are greased periodically, or bearings that are intermittently lubricated via lubrication lines. The main objective of the housing or frame is to protect the interior electrical (i.e., motor winding and armature) and mechanical (i.e., bearings, shafts) components. In general the housing is cylindrical shaped and is the main source of radiated noise to a work area. Government regulations, worker comfort and safely, and quality control are some of the reasons that the motor radiated noise much be reduced.

Current practices for reducing motor noise may be classified into three main groups: passive, active, and hybrid silencers or barriers. Current passive silencers (or barriers) are mostly used for pipes, ducts, and fan-cooled motors. They are usually comprised of two or more metallic and sound absorbing layers. In particular, passive silencers have been shown to be effective in the high frequency range (i.e., above 125 Hz). To be effective at frequencies below 500 Hz, the mass of the passive silencers can be substantial. Active silencers may be more practical in the lower frequency range. Active silencers usually have one or more sensors that are used to sample input frequency and make some adjustment via actuators or loud speakers to cancel the radiated noise. In short, the loud speakers inject a 180° out-of-phase sound with the same frequency and magnitude in order to cancel the radiated noise. Due to limitations in data collection, data processing and actuator response times, active silencers are most practical in the lower frequency ranges (i.e., below 200 Hz).

Hybrid silencers comprise both passive and active elements. In addition to a passive multi-layer configuration, hybrid silencers usually have active features as describe above. The cost versus performance issues of the active and hybrid silencers is an on-going issue in the current market. Furthermore, current passive, active, or hybrid silencers may interfere with the heat exchanger systems of the motors. That is, if heat is not efficiently removed from the motor system, the service-free life of a motor could be significantly reduced, thereby increasing maintenance and operational cost while reducing productivity due to excess downtime.

For the reasons stated above, and for other reasons stated below which will become apparent to those skilled in the art upon reading and understanding the present specification, there is a need in the art for motor silencers that are effective in a broadband frequency range and economically viable to industries. Furthermore, a need exists for a silencer that allows for adequate cooling of the motor creating the noise.

SUMMARY OF THE INVENTION

The above mentioned problems with motor silencers and other problems are addressed by the present invention and will be understood by reading and studying the following specification. The present invention provides a motor silencer that reduces noise by providing a multi-layer shell that does not act as a secondary source of noise. A vibration bases cooling system can also be provide in embodiments of the invention.

In one embodiment, a motor silencer comprises a sound absorbing housing, and a motor mount system located inside the housing. The motor mount system uses vibration motion from a motor to pump air through the housing.

In another embodiment, a motor system comprises a motor, and a motor silencer coupled to the motor. The silencer comprises a multilayer sound absorbing housing having an inside chamber, and first and second motor mounts coupled to the motor and the housing. Each motor mount forms an air pump that pumps air through the inside chamber of the housing.

The motor mounts include an air chamber that can be compressed and expanded in response to vibrations from the motor. A one way air valve controls the direction of airflow resulting from the volume changes of the air chamber.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

Figure 1:
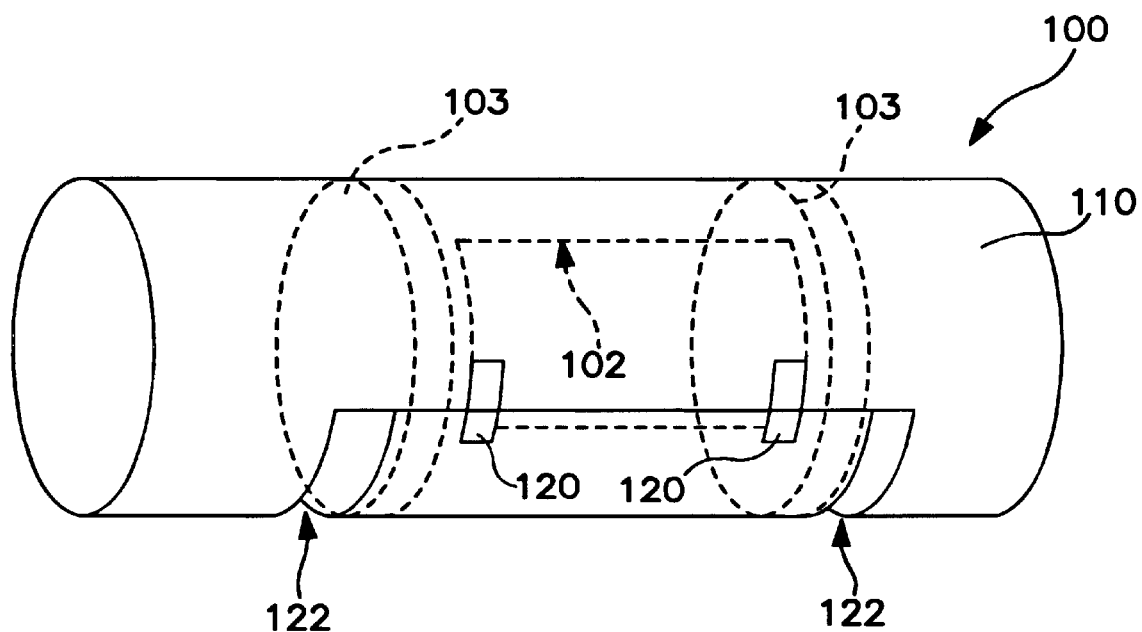
FIG. 1 is a perspective view of one embodiment of a motor silencer of the present invention.

One embodiment of the present invention, illustrated in FIG. 1, provides an electric motor silencer 100 that uses a motor's vibrations to provide air ventilation for the motor. The silencer 100 includes two motor mounts 103 that convert motor vibrations into air movement. The motor and motor mounts are provided in an inner chamber of the silencer housing. The present invention can be used with a wide variety of noise generating sources, and is not limited to the electric motor 102 described herein. One example application of the present invention is in the use of a noise silencer for electric motors used in the mining industry. Electric motors are often used to create vibrations that shake sifting screens. As known to those skilled in the art, sifting screens are used to separate material of different sizes. The electric motors are designed to be out of balance such that the rotation of the motor is in a non-circular pattern, such as elliptical. Because these motors are often used inside of a factory, and numerous motors are used simultaneously, excessive noise is generated. Further, because the environment in which the motors are used is usually quite dirty, the use of additional cooling fans/motors is not desired. One embodiment of the present invention addresses these issues by providing a noise reduction silencer that uses vibrations created by the motor to provide for cooling of the motor.

Figure 2:
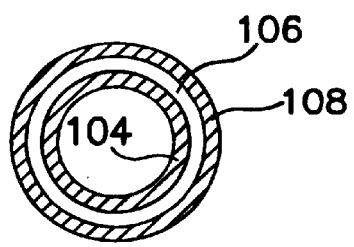
FIG. 2 is a cross section of the shell of the motor silencer of FIG. 1.

One embodiment of the present invention is in the general shape of a hollow cylinder with a multi-layer wall. Referring to FIG. 2, one embodiment of the multi-layer wall comprises a three-layer wall system having an inner layer 104, a middle layer 106 and an outer layer 108. The three layer wall can be fabricated such that the inner and outer layers are metallic (i.e., aluminum or steel) and the middle layer is made of a sound absorbing material. The middle layer offers a soft coupling between the outer and inner layers. For example, the middle layer can be comprised of air, liquid (i.e., water), rubber, the like or a combination thereof. Further, a viscoelastic material (i.e., sorbothane available from Sorbothane, Inc., Kent, Ohio) can be used for the middle layer. In particular, sorbothane offers effective noise/sound absorption characteristics at low frequency ranges. As the material is deformed, energy is moved perpendicularly away from its original plane and is pushed close to 90 degrees out of phase from its original disturbing force location (sheer motion). Thus, the middle layer provides a weak coupling of the inner and outer layers and suppresses vibration of the inner and outer layers. As such, the shell does not become a source of radiation at low frequencies. The composition of the middle layer material, therefore, may be selected to provide a sheer motion in response to noise vibrations, not a compression motion. This multi layer shell provides a motor silencer that has a noise reduction of more than 5 dBA. In prototypes, a reduction of about 6 dBA to 15 dBA has been achieved.

It will be appreciated by those skilled in the art with the benefit of the present disclosure, that different materials can be used for the multi-layer wall in the present invention is not limited to the materials described above. For example, the inner and outer layers can be fabricated from nonmetallic materials, such as plastic or a composite material. Openings in the inner layer can be provided to allow for direct noise absorption by the middle layer. The mechanism of noise reduction, however, is based on reflection of sound that reaches the inner layer (impedance mismatch), sound absorption by the middle layer, reflection by the outer layer, and an inside impedance mismatch between the middle layer and the outer layer.

Figure 3:
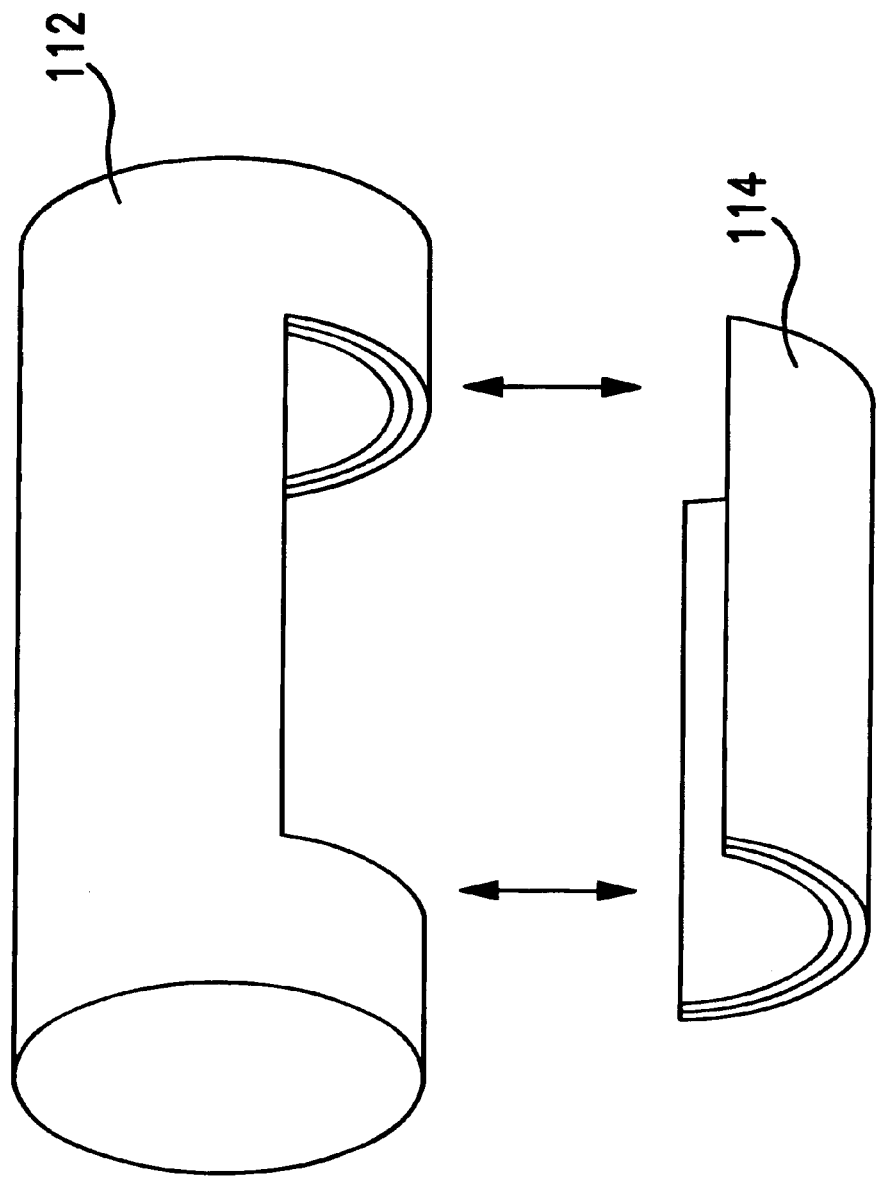
FIG. 3 illustrates the upper and lower components of the motor silencer of FIG. 1.

Referring to FIGS. 1–3, an example embodiment of the motor silencer of the present invention is described. The motor silencer includes a cylindrical shell, or housing, 110 that is partitioned into upper 112 and lower components 114. The two components are joined along the elongated sides of the silencer cylindrical shell. Separating the shell into multiple components allows for the easy assembly of the motor silencer around a motor. As such, accessing the motor for servicing remains relatively easy. In one embodiment, the cross section of the lower component is approximately one quarter of the cylindrical shell 110 while the upper component completes the shell. The lower component, which goes under a motor, is made smaller for easy installation. In addition, one embodiment of the lower component has a length that is less than the length of the opening in silencer shell. That is, gaps 122 are provided at both ends of the lower component when assembled with the upper component, see FIG. 1. These gaps allow for airflow, as described below, and also provided access for motor mounts and wiring coupled to the motor.

The two ends of the silencer cylindrical shell are substantially closed with flat multi-layer plates. Again, the basic cylindrical shape of one embodiment of the present invention has been selected based upon the shape of the motor originating noise. Other shapes are contemplated without departing from the present invention. For example, a rectangular outer shell may provide certain benefits in assembly. In addition, the ends of the silencer can be circular to form an overall capsule shape.

In operation, the silencer is wrapped around on a motor and fasteners located at each side of the cylinder are used to couple the upper and lower components together. In one embodiment, the fasteners 120 (FIG. 1) are four rubber straps that connect the upper and lower parts of the shell. The rubber straps make it relatively easy to install or remove the silencer from the electric motor.

Figure 4:
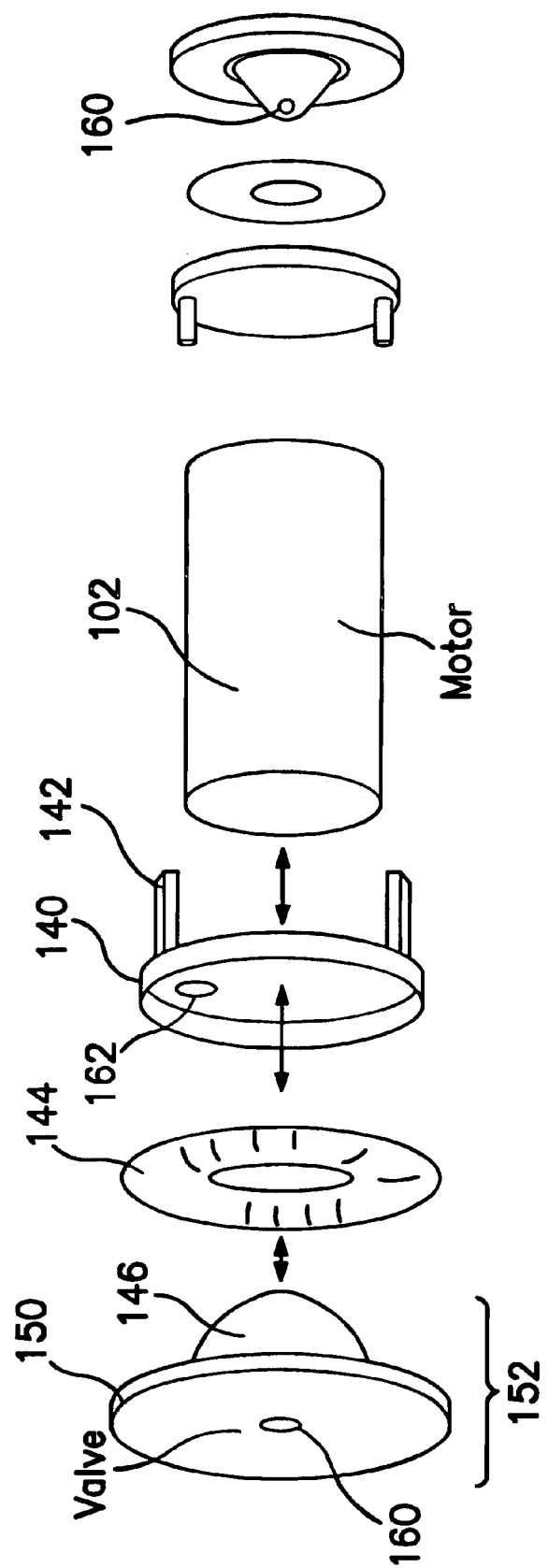
FIG. 4 is an exploded view of one embodiment of a motor support system of the present invention.

Referring to FIG. 4, an exploded view of a motor support system, or motor mount, is illustrated. The support system includes a motor support 140, a doughnut-shaped air-filled tube 144, and a seal 152. In one embodiment the seal comprises a cone 146, and a cone support 150. Each of these components can be made from a rubber material; however, the motor support can be fabricated from a different material, such as metal. Further, the seal can be fabricated from a flexible material such as, plastic or a composite material. The cone shape is not required in by the present invention, and can be a different shape that seals to tube 144 and the housing, such as spherical, without departing from the present invention. The support system illustrated in FIG. 4 supports both ends of the motor inside the silencer, and each motor mount forms an air pump. The support system couples the motor to the interior surface of the silencer such that there is no direct contact between the motor and the silencer. It will be appreciated by those skilled in the art that the motor is coupled, or mounted, to an external system such as a shaker table. The silencer, therefore, includes openings 122 to allow the motor mounts to pass through the silencer without physical contact with the silencer shell. As such, the motor and support system fit longitudinally inside the silencer shell and within the length of the lower component 114.

The motor support of the embodiment illustrated provides forks 142 that couple over the exterior surface of the motor. In other embodiments, the motor support 140 can be attached to the motor using physical connectors, such as bolts. Likewise, in another embodiment the motor can include the motor support as part of the motor housing. Seal 152 can be fabricated as either a single integral piece, or as a multiple part assembly. One multiple part assembly includes the cone 146 and the cone support 150. The cone support has an outside diameter that is equal to, or slightly larger than, the interior diameter of the silencer. A hole 160 is provided through the cone/cone support. Likewise, an opening 162 is provided through the motor support. Opening 162 and hole 160 can be axially aligned, or offset from each other. An air path, therefore, is defined from one end of the silencer to the other end of the silencer. This air path passes through one seal, through the motor support to the motor. The air than passes out the other motor support and through the second seal. One or more openings can be provided in the end of the silencer to allow for ventilation, as described below. Again, these openings can be the same openings 122 used to allow access to the motor for mounting.

A one way valve (not illustrated) is provided in the opening 160 of each seal or alternately in opening 162. The one way valves are provided so that air can be drawn in one end and can exit from the other end of the silencer. As the motor vibrates, the seal structure replicates a smaller version of the motor motion. The cone is pressed against the air-filled rubber tube creating a sealed interface. The combination of the cone structure and the air filled tube motion, the sealed interface, and the one way valves create an efficient air pump whose input energy comes from the vibration motor. That is, the air pocket, or chamber, defined by the inside of tube 144, cone 146 and support 140 can change volume in response to vibrations from the motor. The one way valve controls the direction of airflow from the air pocket. At one end of the silencer, when the air pocket is compressed, air is forced through the opening in mount 140. When the air pocket is expanded, air is drawn through the seal. As such, a separate fan or pump is not required with the motor silencer of the present invention. It will be appreciated by those skilled in the art with the benefit of the present description that the ventilation system described can be provided by combining the features of the mounting system into integral parts. The present invention, therefore, describes a motor silencer that uses vibrations provided by the motor to provide ventilation for cooling the motor. While two motor mount air pumps provide for sufficient air flow, one air pump may provide adequate air flow for different motor designs and operating ranges.

In another embodiment, the seal structure can be placed in the silencer such that the axis of the seal structure is not aligned with an axis of the housing. That is, motor support 140, a doughnut-shaped air-filled tube 144, and a seal 152 can be coupled to the side of a motor such that the seal structure is more vertically aligned. The air pump will operate as described above to circulate the air inside the silencer. This embodiment, does not seal cone support 150 to the housing interior surface to define a specific ventilation path, but provides for air movement inside the silencer. Again, different embodiments are contemplated that provide a multilayer motor silencer and vibration based ventilation system.

The incorporation of this vibration-based air pump in the silencer offers several advantages. The vibration-based air pump puts air trapped in the silencer into motion and thereby acts as a heat exchanger for the motor. The vibration-based air pump converts excess energy, which other wise generates excess vibration and noise, into a harmless and useful air movement. In fact, the air movement acts as a dampening mechanism for both noise and vibrations. The air pump also creates an air cushion for the silencer so no direct contact is made between the motor and silencer.

Figure 5:
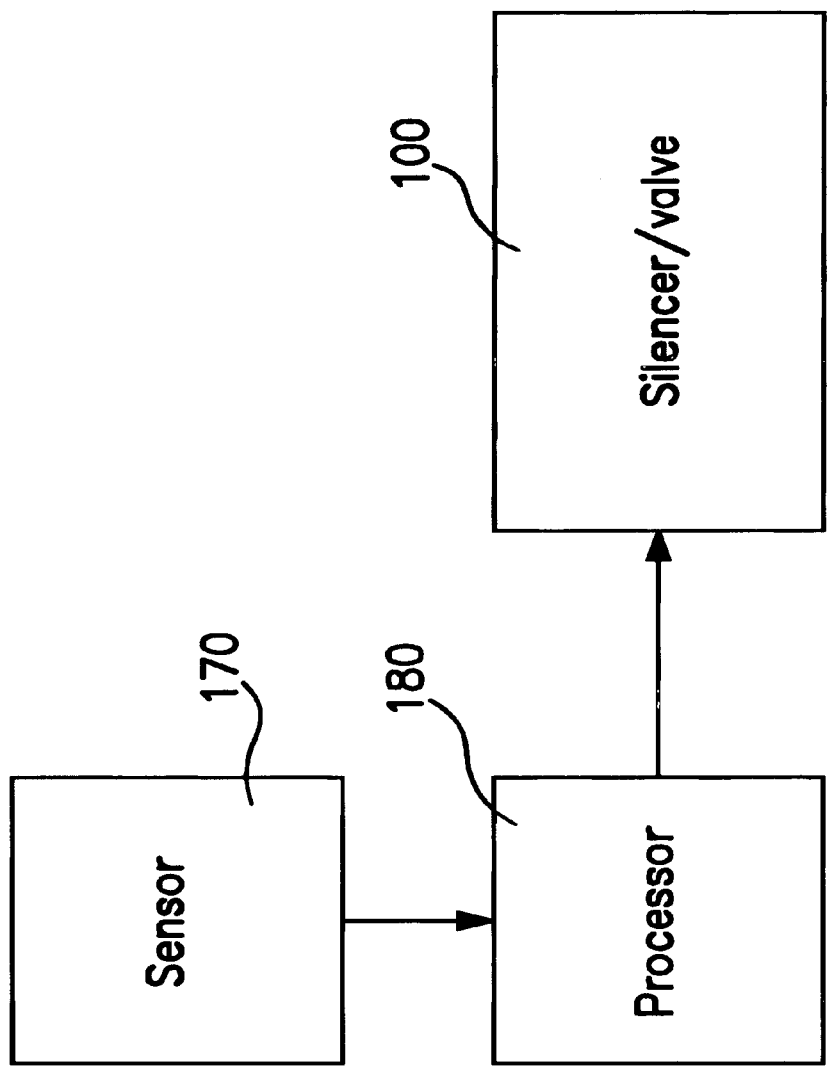
FIG. 5 is a block diagram of an active motor silencer embodiment of the present invention.

An embodiment of the present invention can be provided that is active, see FIG. 5. The active silencer includes a sensor 170 and a processor 180. The silencer 100 of this embodiment includes a controllable valve and an active media as the middle layer 106 sandwiched between the inner 104 and outer 108 layers of the shell. The active embodiment of the silencer may be used in applications for which motor speed is changed during its operation. In this case, the sensor 170 is used to determine an operating speed of a motor. The processor 180 can use a look-up table, or data chart to change the stiffness and damping properties of the active middle layer of the silencer and the valve opening. The active middle layer may be made of air-filled cushions, liquid-filled cushions, and smart viscoelastic materials. The valve opening may be actively controlled by a electromechanical device or smart materials such as Shape Memory Alloys (SMA) or ceramic-based actuators such as PZT or PMN.

Conclusion

A motor noise silencer has been described for reducing noise at a source, such as an unbalanced electromechanical motor. The silencer, in one embodiment, comprises a multilayer shell and an integrated vibration-based cooling system. The shell has an inner layer, a middle sound and vibration absorbing layer, and an external layer. The middle layer offers a soft coupling between the outer and inner layers. For example, it may be comprised of air, liquid, rubber, the like or a combination thereof. The mechanism of noise reduction is based on reflection of sound that reaches the inner layer, sound absorption by the middle layer, reflection by the outer layer, and an inside impedance mismatch between the middle layer and the outer layer. The heat trapped within the silencer is channeled out by utilizing the vibratory motion of a source (i.e., motor) and motor support system. In one prototype example, the noise reduction was measured to be about 6 dBA to 15 dBA. As such, the silencer provides a considerable amount of noise reduction, while providing ventilation using vibration generated by the motor.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A motor silencer comprising:

a sound absorbing housing; and a motor mount system located inside the housing, the motor mount system uses vibration motion from a motor to pump air through the housing.

2. The motor silencer of claim 1 wherein the sound absorbing housing comprises multiple layers of material.

3. The motor silencer of claim 2 wherein the sound absorbing housing comprises:

an inner layer;

a middle layer; and outer layer.

4. The motor silencer of claim 3 wherein the inner material layer and outer layer are fabricated from metal, and the middle layer is fabricated from the sound absorbing material selected from the group comprising gas, liquid, rubber, and viscoelastic material.

5. The motor silencer of claim 1 wherein the motor mount system forms an air pump comprising:

a motor support;

a seal structure; and a gas filled tube coupled between the motor support and the seal structure, such that the vibration motion from the motor is coupled from the motor support to the seal structure via the gas filled tube.

6. The motor silencer of claim 5 wherein the motor support, the cone, in the gas filled tube are fabricated from rubber.

7. The motor silencer of claim 5 further comprising a one way air valve located in an opening provided in the seal structure.

8. The motor silencer of claim 5 wherein the seal structure has an outside surface that forms a seal contact with an inside surface of the housing.

9. The motor silencer of claim 1 wherein the housing comprises:

an upper component;

a lower component; and at least one fastener for coupling the upper and lower components together.

10. The motor silencer of claim 1 further comprising:

a sensor for determining an operating speed of the motor; and a processor coupled to the sensor for controlling a sound absorbing property of the housing and controlling a volume of air pumped by the motor mount system in response to the sensor.

11. A motor system comprising:

a motor; and a motor silencer coupled to the motor comprising,
   a multilayer sound absorbing housing having an inside chamber, and
   first and second motor mounts coupled to the motor and the housing, each motor mount forms an air pump that pumps air through the inside chamber of the housing.

12. The motor system of claim 11 wherein the first and second motor mounts each comprise:

a motor support;

a doughnut-shaped tube;

a seal coupled to an interior surface of the housing and the doughnut shaped tube, the seal having an opening; and a one way air valve located in the opening of the seal.

13. The motor system of claim 12 wherein the motor support is formed as part of a housing of the motor.

14. The motor system of claim 11 wherein the sound absorbing housing comprises:

an inner metallic layer;

a middle sound absorbing layer; and outer metallic layer.

15. The motor system of claim 14 wherein the middle sound absorbing layer is fabricated from a material selected from the group comprising a gas, liquid, rubber, and viscoelastic material.

16. The motor system of claim 11 further comprising:

a sensor for determining an operating speed of the motor; and a processor coupled to the sensor for controlling a sound absorbing property of the housing and controlling a volume of air pumped by at least one of the first and second motor mounts in response to the sensor.

17. A method of reducing noise radiated by a motor, the method comprising:

mounting the motor in a multilayer sound absorbing silencer housing; and pumping air through the sound absorbing silencer housing by using vibration provided by the motor as input energy to an air pump provided in the sound absorbing silencer housing.

18. The method of claim 17 wherein the air pump comprises:

a motor mount having an air pocket that can be compressed or expanded in response to the vibration provided by the motor; and an air valve coupled to the motor mount for controlling a direction of air flow.

19. The method of claim 18 wherein the motor mount comprises:

a motor support;

a seal structure; and a doughnut-shaped tube located between the motor support and the seal structure, and the air pocket is defined by an interior surface of the tube, a contact point between the tube and the seal structure, and a contact point between the tube in the motor support.

20. The method of claim 17 wherein the sound absorbing silencer housing comprises:

an inner metallic layer;

a middle sound absorbing layer; and outer metallic layer.

21. A motor silencer comprising:

a sound absorbing housing comprises an inner metallic layer, a middle sound absorbing layer, and an outer metallic layer, wherein the middle sound absorbing layer suppresses noise radiation from the inner and outer layers to so that the housing does not function as a low frequency secondary noise source.

22. The motor silencer of claim 21 wherein the middle sound absorbing layer is fabricated from a material that provides a sheer motion in response to vibrations.

* * * * *